(12) United States Patent
Bol et al.

(10) Patent No.: US 8,465,647 B2
(45) Date of Patent: Jun. 18, 2013

(54) ISOLATION OF SINGLE-WALLED CARBON NANOTUBES FROM DOUBLE AND MULTI-WALLED CARBON NANOTUBES

(75) Inventors: Ageeth A. Bol, Yorktown Heights, NY (US); George S. Tulevski, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 683 days.

(21) Appl. No.: 12/636,426

(22) Filed: Dec. 11, 2009

(65) Prior Publication Data

US 2011/0142743 A1  Jun. 16, 2011

(51) Int. Cl.
  *B01D 11/00*  (2006.01)
  *B01D 17/038*  (2006.01)
  *C01B 31/02*  (2006.01)

(52) U.S. Cl.
  USPC ........... 210/634; 210/787; 210/789; 423/460; 423/461; 977/845

(58) Field of Classification Search
  USPC ......... 210/511, 512.1, 634, 787, 789; 494/23, 494/27, 35, 37, 43, 15–19; 423/445 B, 460, 423/461; 977/742, 751, 752, 842, 845
  See application file for complete search history.

(56) References Cited

U.S. PATENT DOCUMENTS

| | | | |
|---|---|---|---|
| 3,850,368 A * | 11/1974 | Boeckeler | 425/430 |
| 4,824,560 A * | 4/1989 | Alspector | 209/208 |
| 6,896,864 B2 | 5/2005 | Clark | |
| 7,074,310 B2 * | 7/2006 | Smalley et al. | 204/450 |
| 7,357,906 B2 * | 4/2008 | Colbert et al. | 423/447.1 |
| 7,361,430 B1 | 4/2008 | Gennett et al. | |
| 7,662,298 B2 * | 2/2010 | Hersam et al. | 210/781 |
| 8,153,014 B2 * | 4/2012 | Doorn et al. | 210/781 |
| 8,193,430 B2 * | 6/2012 | Papadimitrakopoulos et al. | 210/749 |

(Continued)

FOREIGN PATENT DOCUMENTS

JP   2006-265035   3/2005

OTHER PUBLICATIONS

Hennrich et al., "Improving separation techniques for single-walled carbon nanotubes: Towards mono disperse samples", phys. stat. so. (b) 245, No. 10, 1951-1953 (2008) / DOI 10.1002/pssb.200879555.

(Continued)

*Primary Examiner* — Joseph Drodge
(74) *Attorney, Agent, or Firm* — Scully, Scott, Murphy & Presser, P.C.; Vazken Alexanian

(57) ABSTRACT

A method and system are disclosed for separating single-walled carbon nanotubes from double and multi-walled carbon nanotubes by using the difference in the buoyant density of Single-Walled versus Multi-Walled carbon nanotubes. In one embodiment, the method comprises providing a vessel with first and second solutions. The first solution comprises a quantity of carbon nanotubes, including single-walled carbon nanotubes and double and multi-walled carbon nanotubes. The single walled nanotubes have a first density, the double and multi-walled nanotubes having a second density. The second solution in the vessel has a third density between said first and second densities. The vessel is centrifuged to form first and second layers in the vessel, with the second solution between said first and second layers. The single-walled carbon nanotubes are predominantly in the first layer, and the second and multi-walled carbon nanotubes are predominantly in the second layer.

20 Claims, 1 Drawing Sheet

U.S. PATENT DOCUMENTS

| | | | |
|---|---|---|---|
| 2004/0232073 A1* | 11/2004 | Papadimitrakopoulos | ... 210/634 |
| 2006/0240238 A1 | 10/2006 | Boussaad et al. | |
| 2008/0038183 A1* | 2/2008 | Nakata | ............ 423/447.1 |
| 2008/0290007 A1 | 11/2008 | Fagan et al. | |
| 2010/0105880 A1* | 4/2010 | Sooter | ............ 530/402 |
| 2010/0326891 A1* | 12/2010 | Wang et al. | ............ 209/132 |
| 2011/0042618 A1* | 2/2011 | Strano et al. | ............ 252/301.36 |
| 2011/0174701 A1* | 7/2011 | Gallaway et al. | ............ 209/606 |

OTHER PUBLICATIONS

Green et al., "Processing and properties of highly enriched double-wall carbon nanotubes", Nature Nanotechnology, vol. 4, Jan. 2009, www.nature.com/naturenanotechnology, 2009, pp. 64-70.

Maeda et al., "Large-Scale Separation of Metallic and Semiconducting Single-Walled Carbon Nanotubes", J. AM Chem. Soc. 2005, 127, 10287-10290.

Yu et al., "Separation of Mixed SWNTs and MWNTs by Centrifugal Force—an Experimental Study", Proceedings of the 7th IEEE, International Conference on Nanotechnology, Aug. 2-5, 2007, Hong Kong.

Maeda et al., "Simple purification and selective enrichment of metallic SWCNTs produced using the arc-discharge method", ScienceDirect, vol. 46, Issue 12, Oct. 2008, pp. 1563-1569.

Yanagi et al., "Separations of Metallic and Semiconducting Carbon Nanotubes by Using Sucrose as a Gradient Medium", The Journal of Physical Chemistry, vol. 112, Issue 48, Dec. 4, 2008, pp. 18889-18894.

* cited by examiner

ISOLATED SWCNTs

"WASTE", BOTTOM FRACTION

ISOLATION OF SINGLE-WALLED CARBON NANOTUBES FROM DOUBLE AND MULTI-WALLED CARBON NANOTUBES

BACKGROUND OF THE INVENTION

1. Field of the Invention

The present invention generally relates to methods and systems for processing carbon nanotubes, and more specifically, to isolating single-walled carbon nanotubes from double and multi-walled carbon nanotubes.

2. Background Art

Single-Walled Carbon Nanotubes (SWCNTs), commonly known as "buckytubes," have attracted enormous interest due to their excellent electrical, optical and mechanical properties. SWCNTs are hollow tubular fullerene molecules consisting essentially of $sp^2$-hybridized carbon atoms typically arranged in hexagons. Single-wall carbon nanotubes typically have diameters in the range of about 0.5 nanometers (nm) and about 3.5 nm, and lengths usually greater than about 50 nm.

A key technological challenge is growing high-quality SWCNTs in large quantities. Although Chemical Vapor Deposition (CVD) provides the highest quality SWCNTs, large quantity forest growth is hampered by the presence of Double and Multi-Walled CNTs. The ratio of Single-Walled to Multi-Walled CNTs can vary greatly from one process to another and is difficult to control.

Several methods of synthesizing fullerenes have developed from the condensation of vaporized carbon at high temperature. Fullerenes, such as $C_{60}$ and $C_{70}$, may be prepared by carbon arc methods using vaporized carbon at high temperature. Carbon nanotubes have also been produced as one of the deposits on the cathode in carbon arc processes.

Single-wall carbon nanotubes have been made in a DC arc discharge apparatus by simultaneously evaporating carbon and a small percentage of Group VIIIb transition metal from the anode of the arc discharge apparatus. These techniques allow production of only a low yield of carbon nanotubes, and the population of carbon nanotubes exhibits significant variations in structure and size.

Another method of producing single-wall carbon nanotubes involves laser vaporization of a graphite substrate doped with transition metal atoms (such as nickel, cobalt, or a mixture thereof) to produce single-wall carbon nanotubes. The single-wall carbon nanotubes produced by this method tend to be formed in clusters, termed "ropes," of about 10 to about 1000 single-wall carbon nanotubes in parallel alignment, held by van der Waals forces in a closely packed triangular lattice. Nanotubes produced by this method vary in structure, although certain structures may predominate. Although the laser vaporization process produce can produce improved yields of single-wall carbon nanotubes, the product is still heterogeneous, and the nanotubes tend to be too tangled for many potential uses of these materials.

Another way to synthesize carbon nanotubes is by catalytic decomposition of a carbon-containing gas by nanometer-scale metal particles supported on a substrate. The carbon feedstock molecules dissociate on the metal particle surface and the resulting carbon atoms combine to form nanotubes. The method typically produces imperfect multi-walled carbon nanotubes. One example of this method involves the disproportionation of CO to form single-wall carbon nanotubes and $CO_2$ catalyzed by transition metal catalyst particles comprising Mo, Fe, Ni, Co, or mixtures thereof residing on a support, such as alumina. Although the method can use inexpensive feedstocks and moderate temperatures, the yield of single-wall carbon nanotubes can be low, with large amounts of other forms of carbon, such as amorphous carbon and multi-wall carbon nanotubes present in the product. The method often results in tangled carbon nanotubes and also requires the removal of the support material for many applications.

All-gas phase processes can be used to form single-wall carbon nanotubes. In one example of an all gas-phase process, single-wall carbon nanotubes are synthesized using benzene as the carbon-containing feedstock and ferrocene as the transition metal catalyst precursor. By controlling the partial pressures of benzene and ferrocene and by adding thiophene as a catalyst promoter, single-wall carbon nanotubes can be produced. However, this method suffers from simultaneous production of multi-wall carbon nanotubes, amorphous carbon, and other products of hydrocarbon pyrolysis under the high temperature conditions necessary to produce high quality single-wall carbon nanotubes.

BRIEF SUMMARY

Embodiments of the invention provide a method and system for separating single-walled carbon nanotubes from double and multi-walled carbon nanotubes. In one embodiment, the method comprises providing a vessel with first and second solutions. The first solution comprises a quantity of carbon nanotubes, including single-walled carbon nanotubes having a first density, and double and multi-walled carbon nanotubes having a second density. The second solution has a third density between said first and second densities.

The vessel is centrifuged to form first and second layers in the vessel, with the second solution between said first and second layers, wherein the single-walled carbon nanotubes are predominantly in the first layer, and the second and multi-walled carbon nanotubes are predominantly in the second layer. After the centrifuging, at least some of the first layer may be removed from the vessel to remove at least some of the single-walled carbon nanotubes from the vessel.

In an embodiment, the providing includes depositing the quantity of carbon nanotubes in the vessel. In one embodiment, the providing includes dispersing a starting material including said quantity of carbon nanotubes, in an aqueous solution with surfactant. In one embodiment, the providing includes depositing said starting material in the vessel above the second solution. In an embodiment, the first density is less than said third density, and in one embodiment, the first solution has a combined density less than said third density.

In an embodiment of the invention, separation of the SWCNTs from double and multi-walled carbon nanotubes is achieved by using the difference in the buoyant density of Single-Walled versus double and Multi-Walled CNTs. The starting material is dispersed in an aqueous solution containing surfactant. This solution is then added to a centrifuge tube, under which a higher density solution is layered. The centrifuge tube is centrifuged at high speeds causing the CNTs to sediment. The solution is tailored so that the buoyant density of the SWCNTs is in between the two solution densities causing the SWCNTs to sediment at the interface. The MWCNTs and large bundles have a higher buoyant density and thus sediment below the interface. The isolated SWCNTs can then be simply removed via pipette.

DETAILED DESCRIPTION

Figure 1:
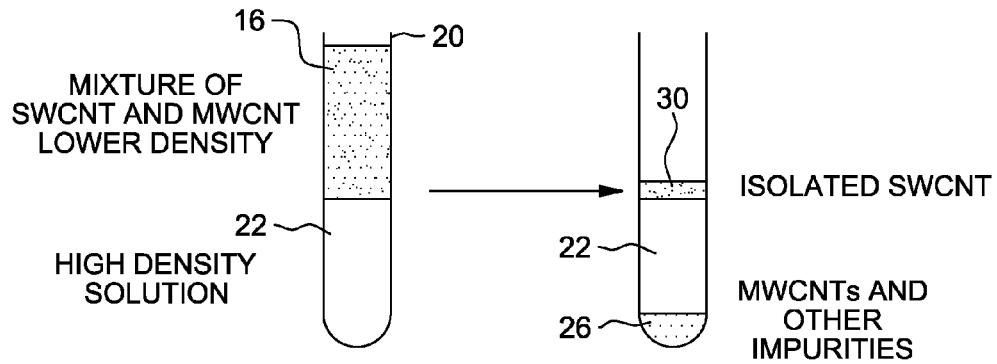
FIG. 1 schematically shows a system according to one embodiment of the invention.
Figure 2:
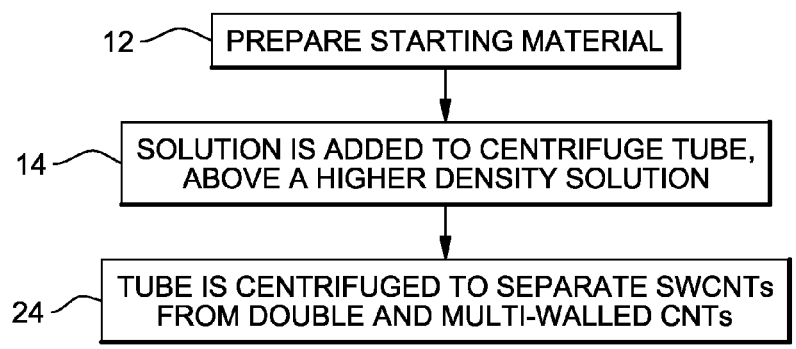
FIG. 2 illustrates a method embodying the present invention.

The present invention, generally, relates to methods and systems for isolating single-walled carbon nanotubes (SWCNTs) from double and multi-walled carbon nanotubes. With reference to FIGS. 1 and 2, in an embodiment, the invention uses the difference in the buoyant density of Single-Walled versus double and Multi-Walled CNT. At step 12, the starting material is dispersed in an aqueous solution containing surfactant. At step 14, this solution 16 is then added to a centrifuge tube 20, under which a higher density solution 22 is layered. The centrifuge tube 20 is centrifuged at step 24 at high speeds, causing the CNTs to sediment. The solution is tailored so that the buoyant density of the SWCNTs is in between the two solution densities, causing the SWCNTs to sediment at the interface. The MWCNTs and large bundles have a higher buoyant density and thus sediment, at 26, below the interface. The isolated SWCNTs, at 30, can then be simply removed via pipette.

In one embodiment, the CNT/surfactant solution 16 is prepared by first sonicating a substrate with the CVD grown CNTs in an aqueous solution of sodium cholate for one hour to disperse the CNTs in the solution. The solution is then added to a centrifuge tube 20 until the tube is filled approximately half-way. Below that, a solution 22 containing 30% w/v Iodixinol is layered resulting in a two layer solution in the centrifuge tube. The centrifuge tube is then centrifuged at 200,000 g for 15 hours to allow the CNTs to sediment at their respective positions 24, 26. The centrifuge tube is removed from the centrifuge and the fractions 26,30 are collected via pipette extraction.

Figure 3:
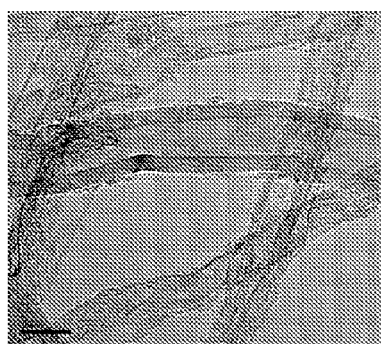
FIGS. 3 and 4 show TEM images of SWCNT and MWCNT fractions isolated in embodiments of the invention.
Figure 4:
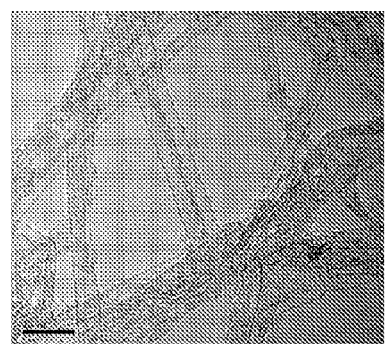

FIGS. 3 and 4 show TEM images of the isolated SWCNT fraction and the MWCNT fractions. As shown in the TEM images, the isolated fraction contains only SWCNTs while the "waste" fraction contains bundles and multi-walled SWCNTs. The images are representative of a number of images over various experiments that confirm the isolation of SWCNT's. Electrical measurements have also been performed on the isolated fraction and show that roughly ⅔ are semi-conducting; which is a hallmark of SWCNTs.

Carbon nanotubes (CNT) may be produced by a variety of methods, and additionally are commercially available. Methods of CNT synthesis include laser vaporization of graphite target arc discharge and HiPCo (high pressure carbon monoxide) process. Chemical vapor deposition (CVD) can also be used in producing carbon nanotubes. Additionally CNTs may be grown via catalytic processes both in solution and on solid substrates.

The solvent used for the nanotube dispersion can be any solvent that will dissolve the dispersant. The choice of solvent is not critical provided the solvent is not detrimental to the nanotubes or dispersant, and may be a mixture. For example, the solution may be water or aqueous based, optionally containing buffers, organic solvents, salts and/or chelators.

A wide array of surfactants, dispersal agents, and other additives may be used in embodiments of the invention. In an embodiment, a dispersant may be used to help disperse the carbon nanotubes in solution. A number of dispersants may be used for this purpose. The dispersant may be a polymer, and examples of polymers that could be suitable for the present invention include, but are not limited to, polyamines, nonionic polymers, anionic polymers, and cationic polymers.

Bio-polymers may also be used as the dispersant. Suitable bio-polymers include, but are not limited to, peptides, proteins, nucleic acids and peptic nucleic acids.

Dispersion of the carbon nanotubes in a liquid can be greatly facilitated by subjecting the nanotubes in liquid to sonification for a sufficient period of time so that all, or at least a significant proportion of, the carbon nanotubes are individually dispersed.

Any suitable surfactant may be used in the practice of this invention. Surfactants can also be used as non-perturbing coatings for suspending individual single-wall carbon nanotubes. "Surfactants" are generally molecules having polar and non-polar ends and which commonly position at interfaces to lower the surface tension between immiscible chemical species. Surfactants can form micellular assemblies with the nanotubes in an appropriate solvent medium. In an aqueous system, the non-polar tail of the surfactant molecules will surround the nanotube, with the surfactant molecules radiating outward from the nanotubes like spokes on a wheel in a micellular-like fashion with the polar end groups on the outside of the micelle in contact with the aqueous media. Anionic, cationic or nonionic surfactants can be used in an appropriate solvent medium. Water is an example of an appropriate solvent medium.

Examples of anionic surfactants include, but are not limited to, N-lauroylsarcosine sodium salt, N-dodecanoyl-N-methylglycine sodium salt and sodium N-dodecanoyl-N-methylglycinate), polystyrene sulfonate (PSS), sodium dodecyl sulfate (SDS), sodium dodecyl sulfonate (SDSA), sodium alkyl allyl sulfosuccinate (TREM), sodium cholate (SC) and combinations thereof. Examples of cationic surfactants that can be used, include, but are not limited to, dodecyltrimethylammonium bromide (DTAB), cetyltrimethylammonium bromide (CTAB), cetyltrimethylammonium chloride (CTAC) and combinations thereof Examples of nonionic surfactants include, but are not limited to, N-lauroylsarcosine or N-dodecanoyl-N-methylglycine, polyethylene glycol dodecyl ether, polyethylene glycol lauryl ether, polyethylene glycol hexadecyl ether, polyethylene glycol stearyl ether, and polyethylene glycol oleyl ether.

Various types of centrifuges can be used in embodiments of the invention; and for example, embodiments of the invention may use fixed angle centrifuges, swinging bucket centrifuges, or vertical or near vertical centrifuges. Selection of a centrifuge may depend on a variety of conditions, such as sample volume, number of sample components to be separated, particle size, desired run time, desired quality of separation and type of separation.

Selection of s suitable vessel for centrifuging also depends upon numerous factors such as, but not limited to, the centrifugation technique to be used, including the rotor in use, volume of sample to be centrifuged, need for sterilization, importance of band visibility, the nature of the sample and any solvent or gradient media, temperature and speed considerations, and whether the tubes or bottles are to be reused.

While it is apparent that the invention herein disclosed is well calculated to fulfill the objects discussed above, it will be appreciated that numerous modifications and embodiments may be devised by those skilled in the art, and it is intended that the appended claims cover all such modifications and embodiments as fall within the true spirit and scope of the present invention.

The invention claimed is:
1. A method of separating single-walled carbon nanotubes from double and multi-walled carbon nanotubes, the method comprising:

providing a vessel with first and second solutions, said first solution comprising a quantity of carbon nanotubes, including single-walled carbon nanotubes dispersed in the first solution and having a first density, and double and multi-walled carbon nanotubes dispersed in the first solution and having a second density, and wherein said second solution has a third density between said first and second densities;

centrifuging the vessel to separate the single-walled carbon nanotubes from the double and multi-walled carbon nanotubes by forming first and second separate layers of the nanotubes in the vessel with the second solution between and separating said first and second layers, wherein the single-walled carbon nanotubes are predominantly in the first layer, and the second and multi-walled carbon nanotubes are predominantly in the second layer; and after the centrifuging, removing at least some of the first layer from the vessel to remove at least some of the single-walled carbon nanotubes from the vessel; and wherein the first solution has a combined density less than said third density to cause the single-walled carbon nanotubes to sediment during said centrifuging at an interface of the first layer of the nanotubes and the second solution.

2. The method according to claim 1, wherein the providing includes depositing the quantity of carbon nanotubes in the vessel.

3. The method according to claim 1, wherein the providing includes dispersing a starting material including said quantity of carbon nanotubes, in an aqueous solution.

4. The method according to claim 3, further comprising sonicating said quantity of carbon nanotubes.

5. The method according to claim 4, wherein the sonicating includes sonicating said quantity of carbon nanotubes before dispersing the starting material in the aqueous solution.

6. The method according to claim 3, wherein the providing includes depositing said starting material in the vessel above the second solution.

7. The method according to claim 6, wherein the first solution has a combined density less than said third density.

8. The method according to claim 1, wherein the providing includes providing the vessel with the first solution above the second solution.

9. The method according to claim 1, wherein the first density is less than said third density.

10. The method according to claim 1, wherein said first layer is above the second solution, and the second layer is below the second solution.

11. The method according to claim 1, wherein the depositing includes dispersing a starting material including said quantity of carbon nanotubes, in an aqueous solution.

12. The method according to claim 11, further comprising the step of sonicating said aqueous material before dispersing the starting material in said aqueous solution.

13. The method according to claim 11, wherein the depositing includes depositing said starting material in the vessel above the second solution.

14. A method of obtaining single-walled carbon nanotubes, the method comprising:

depositing a first solution including a quantity of carbon nanotubes in a vessel, said quantity including single-walled carbon nanotubes dispersed in the first solution and having a first density, and double and multi-walled carbon nanotubes dispersed in the first solution and having a second density;

providing the vessel with a second solution having a density between said first and second densities;

centrifuging the vessel to separate the single-walled carbon nanotubes from the double and multi-walled carbon nanotubes by forming in the vessel a first layer predominantly of the single-walled carbon nanotubes, and a separate, second layer predominantly of the double and multi-walled carbon nanotubes, with said second solution between and separating the first single-walled carbon nanotubes layer and the second double and multi-walled carbon nanotubes layer;

after the centrifuging, removing a portion of the single-walled carbon nanotubes from the vessel; and wherein the first solution has a combined density less than said third density to cause the single-walled carbon nanotubes to sediment during said centrifuging at an interface of the first layer of the nanotubes and the second solution.

15. The method according to claim 14, wherein the centrifuging includes forcing the double and multi-walled carbon nanotubes to a level in the vessel below the second solution.

16. A method of isolating single-walled carbon nanotubes from double and multi-walled carbon nanotubes, the method comprising:

providing a vessel with a first solution including a quantity of carbon nanotubes, including single-walled carbon nanotubes dispersed in the first solution and having a first buoyant density, and double and multi-walled carbon nanotubes dispersed in the first solution and having a second buoyant density, wherein said first and second buoyant densities are different; and using the difference in said first and second buoyant densities to separate the single-walled carbon nanotubes from the double and multi-walled carbon nanotubes in the vessel by forming in the vessel a first layer predominantly of the single-walled carbon nanotubes, and a separate, second layer predominantly of the double and multi-walled carbon nanotubes with a second liquid solution having a third density, between the first and second buoyant densities, between and separating said first and second layers; and wherein the first solution has a combined density less than said third density to cause the single-walled carbon nanotubes to sediment during said centrifuging at an interface of the first layer of the nanotubes and the second solution.

17. The method according to claim 16, wherein said using includes centrifuging the vessel to form first and second layers therein, wherein the single-walled carbon nanotubes are predominantly in the first layer, and the second and multi-walled carbon nanotubes are predominantly in the second layer.

18. The method according to claim 17, wherein the using includes using the second liquid solution to separate the first layer from the second layer.

19. The method according to claim 18, wherein the second liquid solution has a buoyant density between said first and second buoyant densities.

20. The method according to claim 19, wherein the single walled carbon nanotubes and the double and multi-walled carbon nanotubes have a combined buoyant density less than the buoyant density of said second liquid solution.

* * * * *